United States Patent [19]
Russell

[11] 3,867,118
[45] Feb. 18, 1975

[54] APPARATUS FOR PRODUCTION OF GLASS FIBERS

[75] Inventor: Robert G. Russell, Granville, Ohio

[73] Assignee: Owens-Corning Fiberglas Corporation, Toledo, Ohio

[22] Filed: Mar. 19, 1971

[21] Appl. No.: 126,306

Related U.S. Application Data

[63] Continuation of Ser. No. 14,708, Feb. 9, 1970, abandoned, which is a continuation of Ser. No. 636,112, May 4, 1967, abandoned.

[52] U.S. Cl. .................................. 65/12, 425/66
[51] Int. Cl. .......................................... C03b 37/02
[58] Field of Search........... 65/1, 2, 11 R, 11 W, 12; 425/66

[56] References Cited
UNITED STATES PATENTS

| | | | |
|---|---|---|---|
| 3,155,476 | 11/1964 | Drummond | 65/12 |
| 3,345,147 | 10/1967 | Russell | 65/3 |
| 3,518,069 | 6/1970 | Cole | 65/12 X |

*Primary Examiner*—Robert L. Lindsay, Jr.
*Attorney, Agent, or Firm*—Carl G. Staelin; John W. Overman

[57] ABSTRACT

In apparatus for producing filaments of heat-softenable material there is utilized a feeder for feeding material in molten form having orifices from which streams of material flow. The streams are attenuated into filaments. Environmental control means are utilized in the attenuating zone between the steams. A specific embodiment of the environmental control means comprises a shielding means which includes a wick element and a conduit, from which the wick element extends, for supplying to the wick element a liquid which is vaporizable in response to heat absorbed from an adjacent stream. Another specific embodiment comprises a shielding means which includes a wick element and means interiorly of the wick element defining a perforated liquid carrying conduit.

6 Claims, 6 Drawing Figures

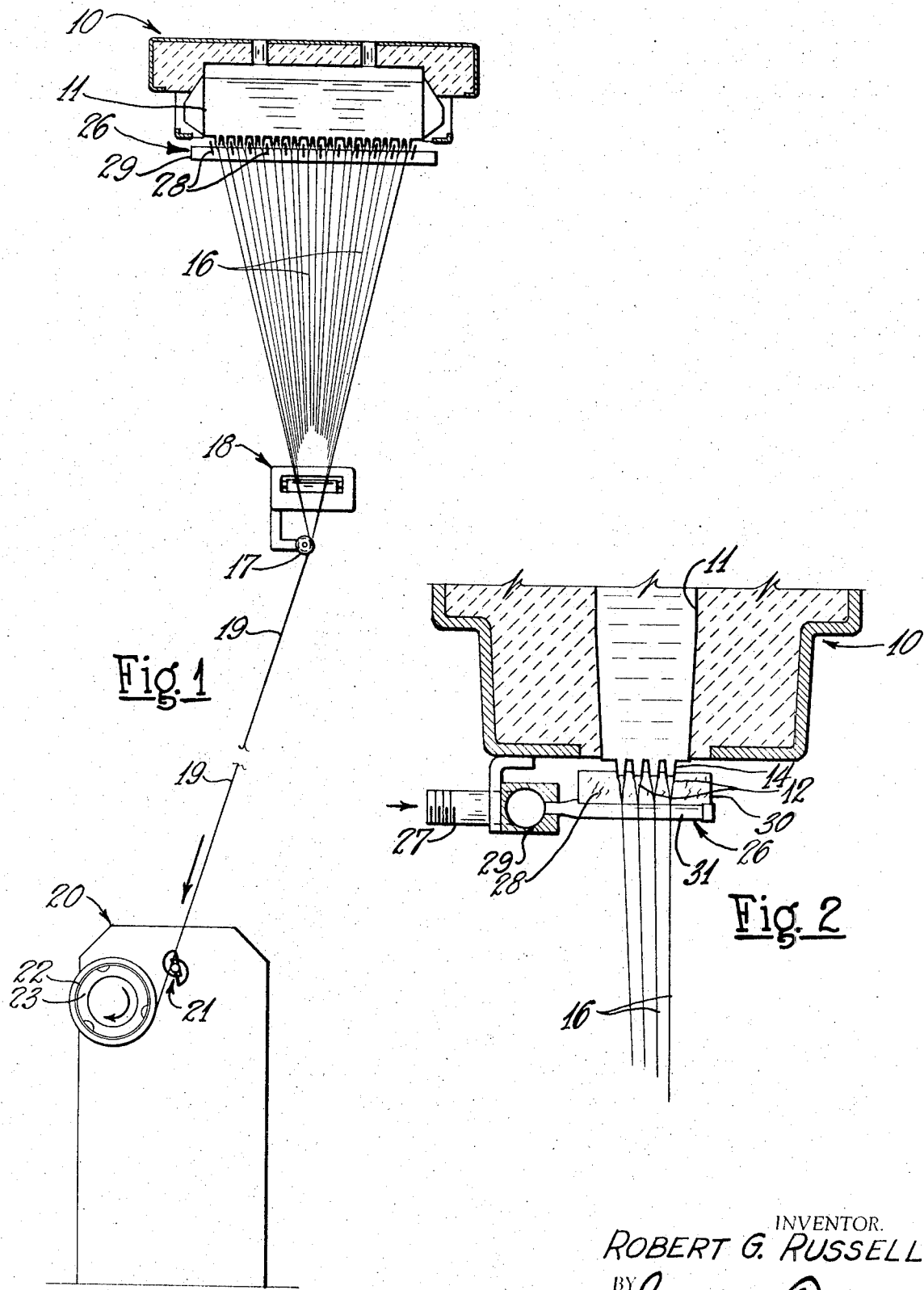

PATENTED FEB 18 1975 3,867,118

INVENTOR.
ROBERT G. RUSSELL
BY Staelin & Overman
ATTORNEYS

APPARATUS FOR PRODUCTION OF GLASS FIBERS

This application is a continuation of application Ser. No. 14,708, filed Feb. 9, 1970, which was a continuation of application Ser. No. 636,112, filed May 4, 1967, both now abandoned.

The invention is herein exemplified by reference to the production of continuous glass fibers wherein streams of molten glass are attenuated mechanically into continuous fibers or filaments of small diameter and then grouped into a strand and wound into a package.

In greater detail, this process of producing continuous fibers of glass involves flowing streams of molten glass from orifices of an electrically heated bushing or feeder associated with a container reservoir in which the material is reduced to a molten condition. The orifices are usually formed in projecting tips or nipples from which heat of the glass is dissipated as it flows in the form of streams therefrom, but may also be formed in the apex of a V-shaped feeder or other structural arrangement such as a flat plate feeder made of a non-wetting alloy. Upon emission to the atmosphere the streams of glass each neck down, as determined by the viscosity and surface tension, to form a cone-like body of the glass from the tip of which the fiber is drawn. The cohesive forces which transmit the attenuation from the fiber to the body of the cone are closely related to the viscosity of the glass. Surface tension of the glass also contributes to the transfer of forces over the periphery of the cone, but, in addition, acts to bring about constriction of the stream into a conical configuration. As the temperature of the melt increases, the viscosity of the fluid from which the fiber is made is lowered and eventually reaches a point where it offers little resistance and the surface tension will actually constrict the material into beads or droplets instead of flowing as a continuous stream. A high viscosity in such fluid, on the other hand, offers higher resistance and slows the constricting forces to such an extent that the viscosity of the fluid is a major factor determining stability in the fiber-forming zone.

Taking these facts into consideration, it can be seen that if the viscosity of a given glass emitted from an orifice to a forming cone is too high, the tension required to be applied to the cool fibers to effect attenuation of the cone can be so high as to result in breakage of the fiber. At the more fluid end of the viscosity range, however, the glass flows more freely and the balance against surface tension becomes somewhat indefinite which causes a form of pumping action or dancing movement of the cones at the feeder tips. The further lowering of the viscosity of the glass results in an approach towards constriction by the surface tension to the extent that discontinuous separate droplets of the fluid are formed.

A range of viscosities therefore exists within which fiberization of the jglass can be accomplished but above and below which fibers are difficult or impossible to produce.

Apparatus has been introduced to the art by way of Pat. No. 2,908,036, issued on Oct. 13, 1959, in which water-cooled shield members are disclosed for disposition immediately adjacent the fiber-forming cones in noncontacting relation with the feeder to absorb heat from the cones by way of radiation absorption and to divide the total number of tips and their respective cones into smaller groups. The shield members shield the environment of the tips and the fiber-forming cones emitted therefrom against extraneous turbulences of the atmosphere outside the zone of fiber formation. The presence of such cooled shield members have made it possible to extend the viscosity range to permit fiberization of glass heated to a higher temperature than could otherwise be fiberized with fluid emitted in an unshielded fiber-forming zone. The fact that the melt can thereby raise to a higher temperature also permits production of fibers of greater uniformity and permits fiberization of glasses which previously were not fiberizable while at the same time making operating conditions less critical to temperature variations due to turbulences in the surrounding atmosphere. By the provision of cooled shield members in the zone of fiber formation, the rate of cooling of the glass emitted from the feeder is not left to the variant conditions of the atmosphere but provides a greater control of the rate of cooling and makes the conditions of fiber formation more certain.

An additional feature which resulted from the adoption of shield members for fiber-forming operations was the increase in the number of rows of tips in a given feeder from which fibers could be attenuated. Previously the number of rows in a given feeder were limited to adjacent rows because if an additional third row were included in a feeder the center row would be so high in temperature from energy radiated to the center row of tips from the outside rows that the glass emitted therefrom would be so fluid as not to allow stable formation of fibers. With the presence of shield members, however, the number of rows could be increased to many more. The increased number of rows are highly desirable because the length of the feeder can be greatly reduced for a given number of fibers to be produced, correspondingly reducing the amount of precious metal such as platinum which is usually used in glass fiber feeder constructions.

A difficulty was presented in the use of such shield constructions in association with glass fiber feeders in that in a matter of hours during periods of constant operation of fiber-forming units, volatile materials emitted by the molten glass were deposited over the shield member surfaces adjacent the cones so that after a period the shield constructions were required to be cleaned in order to make them fully effective again. In Pat. No. 3,150,946, issued Sept. 29, 1964, there was disclosed a fin-shield structure for fiber-forming units wherein the cooled surfaces adjacent each fiber-forming cone are pervious, or in other words, gas permeable, and are retained in cool condition by passage of air therethrough, the air being effective both to provide the cooling for the heat absorption desired and at the same time being effective to clean the member by conveying away particles which might otherwise tend to deposit upon the surface.

In a more recent advance the series of hollow longitudinal gas permeable members illustrated in the above patent have been utilized to provide fixed quantities of vaporizable liquid in the zone of attenuation of the streams in locations between the streams. The liquid in the tubes is continuously transformed into gas within the tube to absorb heat by such transformation and to provide an atmosphere in the zone composed at least partly of the gas evolving through the gas permeable walls of the hollow, gas permeable members carrying the liquid. The fixed quantities of liquid within each hollow member are replenished at a rate matched directly to the rate of consumption of the liquid from the quantity as it is transformed into the gas within the hollow member. Heat removal from the fiber-forming zone is thus accomplished by radiation absorption by the solid shield members themselves, by convection removal of heat with induced air and gases emitted through the permeable walls of the shield members and, in addition, by absorption of heat in transforming the contained liquid to gases to evolve through the shield members.

While the above described apparatus is most satisfactory for certain operations, it is desirable when producing certain types of fibers or filaments to attain as great a uniformity as possible of temperature distribution along the dimensions of the shield member to provide as exacting a control as possible by an environmental control means to, for example, produce filaments having very uniform diameters or to produce very fine filaments having very small diameters.

In view of the foregoing, it is an object of the present invention to provide an efficient, more economical shield structure for fiber-forming operations wherein fibers are attenuated from thermoplastic or heat-softenable materials supplied from orificed feeders.

It is another object of this invention to provide means for the production of continuous fibers of glass wherein shield members are utilized for stabilization of the fiber-forming operation, which shield members have the ability to maintain a substantially uniform temperature throughout their dimensions.

Additionally, it is an object of this invention to provide an efficient means for shielding and absorbing heat from the immediate fiber-forming zone in the production of continuous fibers of thermoplastic materials, which shielding means is formed of materials that will not damage the orificed means of the feeder in the event of accidental collison or bumping during installation or removal of the shielding means.

Another and still further object of the invention is to provide a cooling shield arrangement for the production of fibers which is effective to maintain a uniform temperature along its dimensions and in which the heat absorption capability of such unit may be varied.

In carrying out the above objects the invention features apparatus for producing filaments of heat-softenable material which includes a feeder for feeding such material in molten form having orifices from which streams of such material flow. Means continuously attenuate the streams to filaments in an attenuating zone immediately adjacent the feeder. Environmental control means is disposed in the attenuating zone between the streams subdividing the total number of streams emitted from the orifices into smaller groups so that each stream has a portion of the control means in adjacent heat absorbing and liquid vaporizing relationship therewith. The portion adjacent each stream includes a wick element and means for supplying a liquid to the wick element, which liquid is vaporizable in response to heat absorbed from the adjacent stream.

As shown herein the wick element may be of a fibrous material such as asbestos, a material that is deformable so that it will not injure the orifice tips or the orifice openings of a feeder during installation or removal. The wick element also may be made from a porous solid such as a porous ceramic or a porous metal structure such as sintered aluminum. The above-mentioned wick elements may act by capillary attraction to convey liquid from a supply to the surface of the wick element for vaporization there. The wick element above may also be of a porosity in which the liquid is conveyed through the pores under pressure from the liquid supply.

The porosity of the wick element must be such that liquid may flow therethrough and may not display interfacial tension properties with the liquid so as to provide a restraint or resistance against flow of the liquid in the material. The liquid may be supplied at a rate sufficient to keep the surface of the wick element or member covered with liquid thereby insuring a uniformity of temperature of the wick member throughout its length or other dimension since the temperature of the liquid, and thus the wick member, may not exceed the vaporization or boiling temperature while in liquid form. The liquid may be supplied to all portions of the wick member at a temperature just below its vaporization temperature so that there will not be a variance in heat absorption along portions of the wick member or element caused by the necessity of bringing the liquid from some lower temperature to its vaporization temperature. There are featured herein embodiments for example, asbestos or ceramic wick elements, which are nonconductive to electrical currents and therefore cannot short out or alter the current conduction path within a feeder which is heated by electrical currents flowing therethrough.

An environmental element according to the teachings of this invention may comprise a wick member extending upwardly from a liquid carrying conduit. In an alternative embodiment the control element may comprise a wick member having a liquid carrying and distributing conduit on the inside thereof.

Other objects, advantages and features will become apparent when the following description is taken in conjunction with the accompanying drawings, in which:

FIG. 1 is a view of a general layout of apparatus including shielding components for the production of continuous glass fibers in accordance with the principles of the present invention;

FIG. 2 is an enlarged side elevational view, partly in cross-section, of the glass feeder and associated shield construction shown in FIG. 1;

Figure 3:
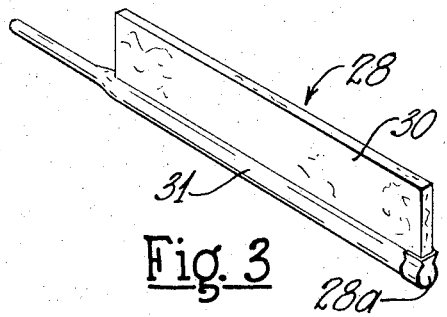
FIG. 3 is an enlarged view of a shield member utilized in the apparatus of FIGS. 1 and 2 and constructed according to the teachings of this invention.

Referring now to the drawings, FIG. 1 illustrates a refractory furnace 10 for reducing the body of glass to a molten condition and having a bushing or feeder 11 associated therewith from which a plurality of streams of glass are emitted from orifices in the feeder for attenuation into fibers 16. The fibers are gathered into a strand by drawing them over a gathering member 17 while sizing fluid is applied to the fibers by a roll type applicator 18 which supplies a sizing to each filament above the point of collection at the gathering member 17. The strand 19 formed by the gathered fibers is packaged by a winder 20 which collects the strand on a tube 22 mounted on a rotating collet 23 and traversed by a suitable traversing device such as a spiral wire traverse 21. The winder provides a force of attenuation for the fibers by reason of rotation of the collet which develops tension in each fiber to withdraw it from the molten glass flowing from the feeder.

The environmental control means 26 of the present invention provides a plurality of heat removing members in the form of shield units 28 each extending across the bottom of the feeder between a pair of rows of feeder tips 14, while each adjacent pair of such fin members has one or two rows of tips aligned therebetween. The orientation of the fins 28 across the under part of the feeder, with feeder tips aligned therebetween may be seen in FIGS. 1 and 2 which illustrate that the tips 14 and the cones 12 emitted therefrom are, in effect, divided into crosswise pairs of rows.

The shield units 28 extend from a longitudinal hollow header 29 disposed laterally with respect to the feeder structure. Liquid is supplied to this header by way of a conduit 27 connected centrally to the backside of the header. One form of the shield unit 28 is illustrated in the enlarged perspective view of FIG. 3 and comprises a wick like element 30 extending upwardly from a liquid supplying conduit 31 which is adapted to be attached to and communicate with the header 29.

Figure 4:
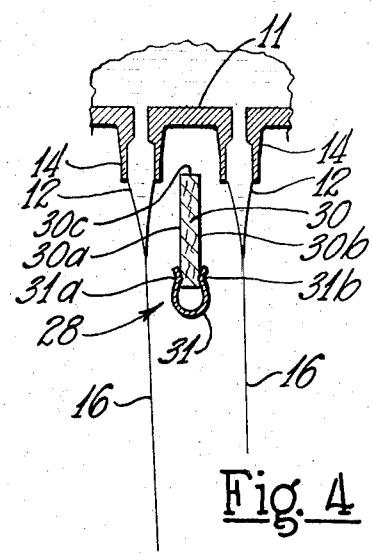
FIG. 4 is a cross-sectional view of the shield member illustrated in FIG. 3 shown in a preferred disposition with respect to streams of glass from which the fibers are drawn.

FIG. 4 illustrates the disposition of the shield unit 28 with respect to two rows of streams 12 issuing or emitting from orificed tips 14. The height of the shield units 28 is preferably such that when in operating position the upper edge of each wick member 30 is at a level slightly above the bottom of the feeder tips 14 with which it is associated. Each wick element or member 30 has surfaces 30a and 30b that are exposed directly to the heat from the cones 12, a top surface 30c being exposed to heat from the feeder 11 while the remainder of the surfaces may be clamped, gripped or otherwise held within the liquid carrying conduit 31. The bottom edges of the exposed surfaces 30a and 30b preferably extend downwardly at least to the level of the apex of the cones emitted from the orifices in the tips 14. In this respect, the wick element 30 may extend about one thirty-second of an inch above the bottom edges of the tips of the feeders. With such positioning of the upper edges of the exposed surfaces of the wick member 30, the height of the exposed surfaces necessary to provide full shielding of the cones in some instances may only be in the order of three-eighths of an inch.

The wick member 30 may be made from a fibrous material such as asbestos which may be readily clamped into the liquid carrying conduit 31, as illustrated by crimp grooves 31a, 31b in FIG. 4. If the shield unit 28 utilizes a wick element 30 of fibrous asbestos, it can readily be seen that the element 30 will be easily deformable and thus will not damage the orifice means of the feeder during installation of or removal of the shield unit 28.

The liquid conduit portion 31 may comprise an open trough of high heat resistant metal or the like. Liquid may be supplied to the trough or liquid conduit 31 without pressure if the conditions existing in the attenuation zone are such that capillary attraction of the liquid within the wick member 30 is sufficient to convey enough liquid from the conduit 31 to the surfaces 30a and 30b of the wick member 30 to provide sufficient liquid for evaporation therefrom to absorb the desired amount of heat. If the conditions within the attenuation zone are such that capillary attraction is insufficient to convey the quantity of liquid desired the liquid in conduit 31 may be put under pressure, which pressure may be raised in accordance with the amount of heat absorption desired. The conduit 31 may itself act as a heat sink to remove heat from the attenuation zone. However, the primary heat absorption or removal is accomplished in this invention by the evaporation of the liquid from the exposed surfaces of the wick element 30. As noted hereinbefore, if sufficient liquid is conveyed from the conduit 31 to the exposed surfaces of the wick element 30 the temperature of the wick element 30 cannot exceed the vaporization temperature of the liquid being supplied thereto.

The rate of heat absorption may also be varied by varying the dimensions of the surfaces of the wick element 30 exposed to the cones in the attenuation zone. Variation of the exposed surfaces may be accomplished by trimming such surfaces to the shapes desired and by obscuring the surfaces with a plating material or with an extension of the trough sides or upwardly extending flanges from the conduit 31.

If the wick element 30 is constructed of asbestos or other similar material having very little electrical conductivity it is apparent that there can be no accidental shorting of the electrical current paths in the feeder 11. Besides the fibrous materials normally known to be non-conductive electrically, porous solids such as a porous ceramic may be utilized to provide the electrical resistance desired while affording the porosity required for supplying liquid for vaporization on an exposed surface thereof. If a high electrical resistance of the shield member is not desired wick elements 30 may be constructed from materials such as porous metals, e.g., sintered aluminum.

Porous solids will ordinarily provide finer dimensional control of the shapes of the wick element 30. Wick elements constructed from fibrous materials may not normally be shaped with the fine dimensional control of porous solids, however such wick elements offer the advantages of deformability in order to avoid damaging the orifices of feeder 11.

The thickness dimension of the wick member 30 may be varied along its length in order to provide a control on the amount of water conveyed to the exposed surfaces. For example, it may be desirable to have the thickness of the wick member 30 larger along the central portion of the shield unit 28 so more water may be conveyed to the middle of the exposed surfaces 30a, 30b. The heat around the cones in the middle of the rows is normally greater than that from the cones at the ends of the rows since the cones at the ends of the rows have the opportunity to radiate heat away on one side. Control of the flow of the liquid from the conduit 31 may also be selectively restricted by varying the opening between the clamping ridges or crimp grooves 31a, 31b of the upwardly extending flanges of the trough or conduit 31. This method of controlling the conveyance of liquid within the wick element 30 is particularly applicable to the deformable type of wick elements such as asbestos or other fibrous materials since the spacing may be easily accomplished during fabrication. In addition control of the movement of the liquid within the wick element 30 may be effected by varying the pore openings and thus varying the capillary attraction and/or creating a greater flow resistance within the wick element 30 at selected areas.

The shield members described herein have particular application to a structural arrangement such as a flat plate feeder made of a non-wetting alloy, which does not have projecting orifice tips to help prevent flooding. Shield members made of deformable, insulating materials thus may be installed very closely to the bottom of the feeder since a bumping of the bottom of the feeder will not damage the orifices nor will the possibility of electrical shorting or conductance be a hindrance. In a flat plate feeder it may particularly be desirable, to provide in the liquid a solution which when released by the vaporization process will aid or assist the non-wetting properties of the bottom of the flat plate feeder. Thus a neutral or inert gas such as $CO_2$ may be contained in solution in the liquid supplied, as well as propane or other carbonaceous gases that may assist the non-wetting process.

All of the materials discussed herein are less expensive than the silver, copper or other highly conductive metals currently being used to conduct heat from the attenuation zone to a heat sink. As noted in FIG. 3, a cap 28a may be provided at the end of the trough or liquid carrying conduit 31 so that when the cap is removed a wick member 30 may be slid from the liquid carrying conduit and replaced by another element. The ease of replacement depends upon the type of material being used for a wick element 30 but does afford an additional advantage.

Although asbestos, porous ceramics and sintered metals have been discussed herein as suitable for use, any suitable wettable material may be utilized which has a melting, or flammable temperature above that of the vaporization temperature of the liquid being utilized.

Figure 5:
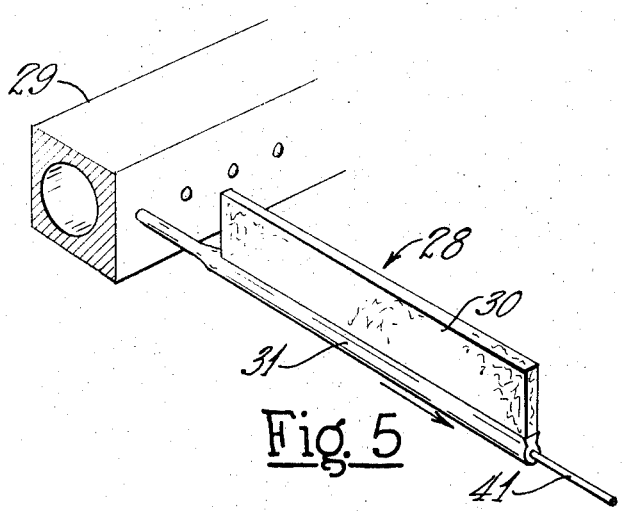
FIG. 5 is a view in perspective of a second embodiment of a shield constructed in accordance with the principles of this invention.

Referring to FIG. 5 there is illustrated still another embodiment of the teachings of this invention in which liquid may be supplied from header 29 to conduit 31 at a temperature just below that of the vaporization temperature of the liquid being utilized. This aids in eliminating non-uniformities across the length of the shield unit 28 since no heat will be absorbed in bringing the liquid from some temperature below vaporization to vaporization temperature. To achieve the uniform distribution of such heated liquid a restricted passage 41 is connected to the end of the liquid conduit 31. The passage 41 may be smaller than the size of the passage 31 by the amount necessary to carry away liquid in excess of that being vaporized by the heat on the exposed surfaces of the wick element 30. Thus a continuous flow of liquid heated to the temperature desired is available for all portions of the wick element 30. The passage 41 need not necessarily be smaller if sufficient pressure is maintained in the liquid circulating system.

Figure 6:
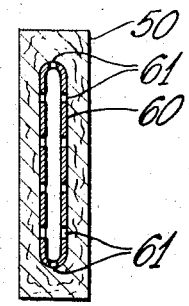
FIG. 6 is a cross-sectional view of a third embodiment of a shield element according to the teachings of this invention.

Referring to FIG. 6 there is illustrated still another embodiment of the teachings of this invention in which a shield unit comprises a wick element 50 having a liquid carrying and distributing conduit 60 mounted in the interior thereof. The liquid carrying conduit 60 has perforations 61 formed therein to provide liquid to the wick element 50. In this embodiment the liquid carrying conduit is insured of staying below the vaporization temperature of the liquid being supplied since it is entirely shielded within the wick element 50.

It is to be noted that although a wick element has been referred to hereinbefore, that a porous body, which is not structured from material ordinarily considered wick material, may be utilized. Such body must have a porosity so that liquid may be conducted to the external heat-absorbing surface or surfaces. The conduction may result from supplying the liquid under pressure or from capillary attraction.

The environmental control means described herein thus provides control elements along which temperature may be uniformly maintained, which shield the cone, fiber-forming and attenuation regions from ambient air currents and disturbances, which may prevent the precipitation of volatiles on the shield elements by the vaporization process on the surfaces thereof, which provide means for variably absorbing heat within selected areas of the attenuation zone and along the length of a particular control element, and which provide a range of heat absorption that has not heretofore been available with the degree of control shown herein.

While I have herein shown and described particular embodiments of my invention, it will, of course, be understood that I do not wish to be limited thereto since many modifications may be made that will fall within the true spirit and scope of the invention.

I claim:

1. Apparatus for producing filaments of heat-softenable material comprising a feeder for feeding such material in molten form having orifices from which streams of such material flow, means for continuously attenuating the streams to filaments in an attenuating zone immediately adjacent said feeder, and environmental control means in said attenuating zone disposed between said streams subdividing the total number of streams emitted from said orifices into smaller groups so that each stream has a portion of said control means in adjacent heat absorbing and liquid vaporizing relationship therewith, said portion adjacent each stream including a wick element of deformable material to prevent feeder damage and means for continuously supplying a liquid to the external surface of the wick substantially along the length of the wick adjacent and exposed to said stream for complete vaporization on said stream adjacent surface in response to heat absorbed from said adjacent stream, said liquid supplying means supplying liquid to said surface at a rate sufficient to replenish the liquid on said surface as the liquid vaporizes completely to maintain the temperature of said surface of said wick element substantially at the vaporization temperature of said liquid to maintain a uniform surface temperature adjacent said stream and including a liquid carrying conduit for each wick, each wick extending from its conduit.

2.

stream including a wick element of deformable fibrous material to prevent feeder damage and means for continuously supplying a liquid to the external surface in response to heat absorbed from said adjacent stream, said liquid supplying means supplying liquid to said surface at a rate sufficient to replenish the liquid on said surface as the liquid vaporizes to maintain the temperature of said surface of said wick element at the vaporization temperature of said liquid to maintain a uniform surface temperature adjacent said stream and including a liquid carrying conduit for each wick, each wick extending from its conduit.

3. Apparatus as defined in claim 2 in which said fibrous material is asbestos.

4. Apparatus for producing glass filaments comprising a feeder for feeding molten glass having projecting tips extending from an undersurface thereof, said tips being aligned in rows and each having an orifice provided therein from which a stream of glass is emitted, means for attenuating the streams in a given zone to fine filaments, said attenuating means acting on said streams in such a way as to impart in general a conical shape to each extending from its base at its respective orifice to an apex from which its respective filament is withdrawn, environmental control means associated with said feeder including wick members arranged in side-by-side parallel relationship and aligned in the zone of attenuation of said streams so that each extends to a position adjacent at least one row of cones emerging from said tips and each row of cones has at least one wick member adjacent thereto, and means for supplying a liquid through said wick members to the surface thereof for vaporization on said surface in response to heat received from said cones to maintain the temperature along said wick member at the vaporization temperature of said liquid, said liquid supplying means including a liquid carrying conduit for each wick member, each wick member extending from its conduit.

5. Apparatus as defined in claim 4 in which each wick member extends upwardly from its conduit and is constructed from an easily deformable material that will not damage said projecting tips in the event that an accidental collision between the tip and wick member occurs.

6. Apparatus for producing filaments of heat-softenable material comprising a feeder for feeding such material in molten form having orifices from which streams of such material flow, means for continuously attenuating the streams to filaments in an attenuating zone immediately adjacent said feeder, and environmental control means in said attenuating zone disposed between said streams subdividing the total number of streams emitted from said orifices into smaller groups so that each stream has a portion of said control means in adjacent heat absorbing and liquid vaporizing relationship therewith, said portion adjacent each stream including a wick element of deformable material to prevent feeder damage and means for continuously supplying a liquid to the external surface of the wick substantially along the length of the wick adjacent and exposed to said stream in response to heat absorbed from said adjacent stream, said liquid supplying means supplying liquid to said surface at a rate sufficient to replenish the liquid on said surface as the liquid vaporizes completely to maintain the temperature of said surface of said wick element substantially at the vaporization temperature of said liquid to maintain a uniform surface temperature adjacent said stream, said liquid supplying means including means extending lengthwise interiorly of the wick defining a perforated liquid carrying conduit.

* * * * *